United States Patent

Hutchins, IV

[11] 3,873,801
[45] Mar. 25, 1975

[54] ASSEMBLY OF ELECTRICAL-DEFLECTION-SENSITIVE TRANSDUCER

[76] Inventor: Thomas B. Hutchins, IV, 310 N.W. Bywood Ln., Portland, Oreg. 97229

[22] Filed: June 15, 1973

[21] Appl. No.: 370,422

[52] U.S. Cl. .................................. 219/85, 29/501
[51] Int. Cl. ............................................ B23k 1/02
[58] Field of Search ....... 219/85; 29/25.3, 500, 501, 29/471.1, 493, 494; 310/9.1; 228/56

[56] References Cited
UNITED STATES PATENTS

| | | | |
|---|---|---|---|
| 2,041,978 | 5/1936 | Taylor | 29/500 X |
| 2,512,426 | 6/1950 | Hartley | 29/501 X |
| 2,602,872 | 7/1952 | Ziegler | 219/85 |
| 3,381,081 | 4/1968 | Schalliol | 219/85 X |
| 3,650,450 | 3/1972 | Larson et al. | 219/85 |
| 3,660,632 | 5/1972 | Leinkram | 219/85 |

FOREIGN PATENTS OR APPLICATIONS
246,622 8/1967 U.S.S.R. ............................ 219/85

Primary Examiner—J. V. Truhe
Assistant Examiner—Clifford C. Shaw
Attorney, Agent, or Firm—Kolisch, Hartwell, Dickinson & Stuart

[57] ABSTRACT

A method of joining, through a meltable bonding material, a conductor, a piezoresistive element, and a carrier for the element in an electrical deflection-sensitive transducer. With the various to-be-joined parts suitably relatively positioned, the conductor, along with a mass of the bonding material, are clamped onto the carrier through a clamp which can conduct electrical current. Current is then passed through this clamp to heat and melt the bonding material, which then flows to join the parts.

4 Claims, 4 Drawing Figures

ASSEMBLY OF ELECTRICAL-DEFLECTION-SENSITIVE TRANSDUCER

BACKGROUND AND SUMMARY OF THE INVENTION

This invention pertains to a method for joining various parts in an electrical deflection-sensitive transducer. In particular, it pertains to a simple, reliable one-shot technique for joining, in such a transducer, a piezoresistive element, a carrier therefor, and conductors for making electrical connections with the element.

A transducer of the type indicated is normally used in applications where extreme accuracy and reliability are required. To this end, it is, of course, important not only to choose carefully the qualities of components which are included in such a transducer, but also to use an assembly procedure which will assure the obtaining of accurate and reliable performance in the final transducer. As is well understood, assembly techniques, if not carefully planned and executed, can result in deficiencies such as imperfect bonds between parts, and appreciable internal stresses which can seriously impair good performance.

A general object of the present invention is to provide a novel method for assembling, in a transducer of the type generally indicated, parts such as those identified above.

More specifically, an object of the invention is to provide a method for simultaneously joining, through a meltable bonding material, a piezoresistive element, a carrier therefor, and conductors which are used to establish electrical connections with the element.

In a transducer employing such parts, information which is to be monitored is suitably mechanically coupled to the carrier, which then, through bending or deflecting, transmits this information to the piezoresistive element. The element and carrier must, of course, be so bonded to one another that information received by the carrier is accurately telegraphed to the element. Such a bond, therefore, must have exceptionally good elasticity and dimensional stability. Elasticity is important in assuring the accurate communication of information between the carrier and element; and dimensional stability is important in preventing, over a period of time, appreciable relative movement, or creep, between the element and carrier.

It is further important that good electrical connections exist with a piezoresistive element. This is necessary if information is to be transmitted accurately to external monitoring equipment.

It is thus seen that two sorts of connections are required: one, a physical force-transmitting connection between a piezoresistive element and its carrier; and the other, an electrical current-transmitting connection between the element and conductors. In the past, in many transducers, two distinct separately made connections have been used, each often involving the use of heat to prepare. Such a situation can, and often does, lead to problems. Chief among them is that the heat used in the second-to-be-made connection often adversely affects the first-made connection by setting up troublesome internal stresses. Such stresses lead to inaccurate performance, and are to be avoided if possible.

Featured in the present invention is an assembly procedure which amply takes these important considerations into account. In particular, the method of the invention employs what might be thought of as a one-shot joining technique wherein a unitary force-transmitting and current-transmitting bond is formed simultaneously between a carrier, an end of a piezoresistive element, and an end of a conductor.

Also featured in the invention are steps which result in the formation of a very strong stable bond between an element and its carrier. Specifically, the invention contemplates steps wherein heat for melting the bonding material used is conveyed through means employed to clamp the bonding material in place prior to assembly. Further, the invention contemplates the surrounding of the region of intended joinder between an element and carrier with a predominantly forming gas atmosphere (by volume about 10% hydrogen and about 90% nitrogen). With melting heat so applied, and surrounding atmosphere so controlled, potentially weakening oxidation of the bonding material during the assembly procedure is obviated.

DESCRIPTION OF THE DRAWINGS

These and other objects and advantages attained by the invention will become more fully apparent as the description which follows is read in conjuction with the drawings, wherein.

DETAILED DESCRIPTION OF THE INVENTION

Figure 1:
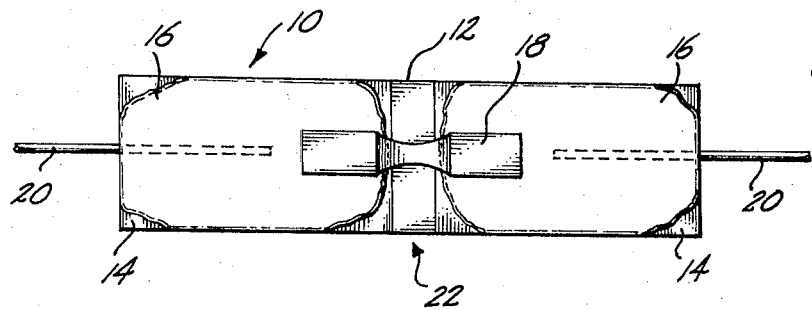
FIG. 1 is a top plan view of a deflection-sensitive transducer constructed in accordance with the method of the invention.
Figure 2:
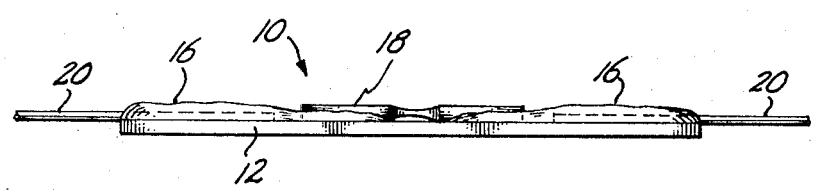
FIG. 2 is a side view taken from the bottom side of FIG. 1.

Turning now to the drawings, and referring first to FIG. 1, indicated generally at 10 is an electrical deflection-sensitive transducer which has been produced in accordance with the method of the present invention. The particular transducer illustrated is one which is especially adapted for use in the tip of a blood-pressure-monitoring catheter, such as that disclosed in U.S. Pat. No. 3,710,781. To this end, transducer 10 is, of course, sized appropriately to fit within the relatively small dimensions of such a tip. It will be understood, however, that the method of the invention is usable in the construction of various other transducers of different sizes.

Transducer 10 includes a generally flat, rectangular, aluminum oxide carrier plate, or carrier, 12, to which are anchored, through spaced-apart metal blankets 14 and bonds 16, the ends of an elongated, slender, silicon piezoresistive element 18, and the ends of a pair of conductors 20. Bonds 16 herein are formed of a gold-tin alloy containing, by weight, about 80 percent gold and about 20 percent tin—these bonds having been formed in accordance with the method of the invention. Metal blankets 14 serve as anchoring interfaces between the surface of carrier 12 and bonds 16.

The specific materials named as forming the carrier and piezoresistive element are conventionally used in a transducer of the type indicated, and are in no way critical to the present invention. In other words, various materials may be used for these components of the transducer.

Metal blankets 14 might typically comprise, and herein do comprise, an inner layer (directly against the carrier) of a metal mixture containing molybdenum and manganese, on top of which has been applied a layer of nickel. These two layers may be prepared in any suitable conventional manner. The inner "moly-manganese" layer is useful in that it bonds extremely well to ceramic material such as aluminum oxide. A nickel overlayer is used since it has been found to afford a good adhering structure for a bond 16.

With transducer 10 sized for the specific purpose indicated earlier, carrier 12 has a length of about 0.2-inches, a width of about 0.05-inches, and a thickness of about 0.006-inches. Blankets 14 each have a length of about 0.09-inches, a width of about 0.05-inches, and a thickness of about 0.001-inches. These two blankets are spaced apart longitudinally axially on the carrier (as can be seen in FIG. 1) by about 0.02-inches—this spacing being indicated generally at 22 in FIG. 1. Bonds 16 extend nearly completely over the tops of blankets 14, and have a thickness, in most areas, of about 0.0013-inches. Element 14 is about 0.075-inches long, with its opposite end portions having rectangular cross sections with dimensions of about 0.025-inches by about 0.005-inches. In the center of its reduced cross section central portion, the element has cross-sectional dimensions of about 0.01-inches by about 0.003-inches. Conductors 20 have diameters of about 0.004-inches.

It should be understood that the particular dimensions just listed have been given for illustrative purposes only.

When transducer 10 is put into use, carrier 12 is suitably mounted in such a manner as to be deflected or deformed by the forces whose characteristics are intended to be monitored. On such a deflection occurring, and as is well understood, a related stress is set up in element 18 which causes the electrical resistance of this element to change.

It is, of course, desirable that the resistance change which occurs in the piezoresistive element as nearly as possible exactly follow, i.e., directly proportionally follow, changes in the particular force causing deflection of the carrier. It is further desirable that such a resistance change be accurately communicated electrically to external apparatus for monitoring purposes.

To these ends, and as has been mentioned above, the present invention proposes a method of transducer construction employing a one-shot technique for simultaneously joining a carrier, a piezoresistive element, and conductors (such as conductors 20). This technique results in a unitary bond, at each end of a transducer, which, through proper selection of a bonding material, serves effectively both as a force-transmitting and as an electrical-current-transmitting medium. The particular bonding material named above has been formed to be especially satisfactory. According to the technique, heat is applied only once for each bond, such procedure greatly minimizing the likelihood of setting up undesirable internal stresses in parts in a transducer. Further, and according to the method of the invention, heat is applied to melt the bonding material in such a way as greatly to minimize the possibility of oxidation occurring in a bond. Oxidation could, of course, significantly adversely affect bond performance.

Describing in detail the method of the invention, and considering the construction of transducer 10, the parts to be joined include carrier 12, element 18, and conductors 20. Let us assume that blankets 14, as described earlier, have already been prepared on the carrier.

Figure 3:
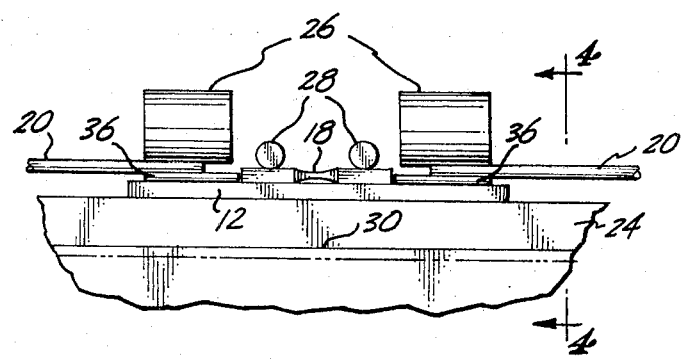
FIG. 3 illustrates, on a somewhat smaller scale than FIGS. 1 and 2, the relative positions of various parts in a transducer such as that shown in FIGS. 1 and 2 just prior to assembly of these parts.
Figure 4:
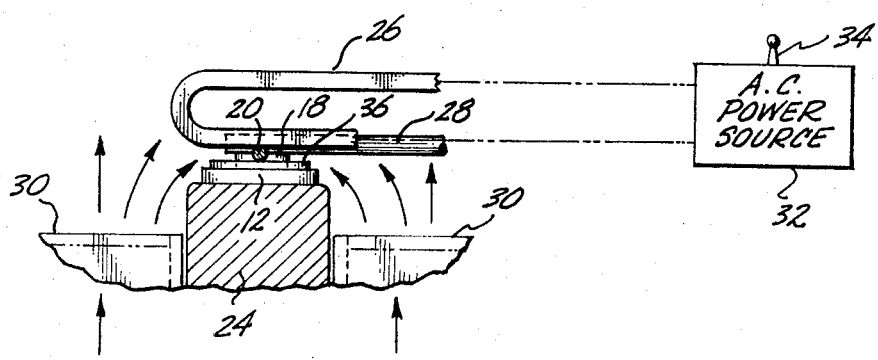
FIG. 4 is a view taken generally along the line 4—4 in FIG. 3.

To begin with, the various parts which are to be joined in the transducer are positioned and suitably clamped in place, as desired, relative to one another. Referring to FIGS. 3 and 4 in the drawings, this situation is illustrated, along with a version of apparatus which may be used for accomplishing it. More specifically, such apparatus, as shown in these figures, includes an elongated support base 24, a pair of outer clamping arms 26 and a pair of inner clamping arms 28. These clamping arms are positioned above the base, and are mounted for movement toward and away from the top thereof. Also included in the apparatus are two elongated gas nozzles 30 which extend along opposite sides of the base.

Base 24 herein is formed of aluminum oxide, and is sized to provide adequate underlying support for carrier 12. In accordance with the invention, it is important that outer arms 26 be capable of conducting electrical current, and by such conducting, generating a considerable amount of heat. To this end, each arm 26 herein is formed of an elongated somewhat U-shaped loop (partially shown) of nichrome which is suitably connected to the output terminals of an external electrical power source, such as the AC power source shown at 32 in FIG. 4. Such a power source may include an on-off switch, such as switch 34. A suitable source, for example, is one capable of delivering about 20 amperes at about 6 volts. Arms 26 herein raise and lower independently of arms 28.

Arms 28 must be capable of withstanding considerable heat, without conducting appreciable heat away during a joining operation. These arms herein are formed of titanium. Arms 28 raise and lower as a unit.

Nozzles 30 are connected to a suitable source (not shown) of forming gas, which may be turned on during a joining operation to produce a flow (preferably a laminar flow) of forming gas which surrounds the region containing transducer parts which are to be joined. Such a flow of gas is indicated by the arrows in FIG. 4. A suitable gas flow rate is about 2 cubic feet per minute.

It should be understood that while portions of a particular form of apparatus have been described as one capable of use in performing the method of the invention, other arrangements of apparatus may, of course, be employed.

As has already been mentioned, FIGS. 3 and 4 show the various parts in transducer 10 clamped in place relative to one another prior to their being joined. Carrier 12 rests on base 24, with blankets 14 facing upwardly in the figures. Element 18 is substantially centered on top of the carrier, and is clamped in place by means of arms 28, which rest on top of the opposite ends of the element.

Indicated at 36 in FIGS. 3 and 4 are two chips, or masses, of a suitable solid meltable bonding material. A preferred material for the purpose indicated has been found to comprise a gold-tin alloy consisting, by weight, preferably of 80 percent gold and 20 percent tin. A chip size suitable for bonding transducer parts having the dimensions mentioned earlier has a length of about 0.07-inches, a width of about 0.04-inches, and a thickness of about 0.002-inches. Such is the case with chips 36.

As can be seen, chips 36 rest directly on the ends of carrier 12, or more specifically on the metal blankets on these ends. Clamping of these chips in place according to the invention is through the end portions of conductors 20, on top of which rest clamping arms 26.

With clamping of these various components accomplished, electrical current is passed through arms 26, thus causing them to heat up. Heated arms 26 then transfer heat (primarily through conduction in conductors 20) to chips 36. Such transferring of heat results in heating, and ultimately melting, of chips 36. With melting of the chips, the end portions of conductors 20, under the influence of arms 26, shift down to engage blankets 14. The molten chips flow over the blankets, and into intimate contact with both element 18 and conductors 20. After such flowing has occurred, current in arms 26 is shut off, and the molten chips are cooled to solidify them as solid deposits, or bonds, 16. With the voltage and current mentioned above, about 12 to 15 seconds of current flow in arms 26 is adequate.

It is thus apparent that a simple one-shot heating operation is all that is required to establish the requisite mechanical and electrical connections between the parts in the transducer. Using the means which effectively clamps in place the chips of bonding material also as the means for supplying heat to melt them obviously results in a very simple operation. Further, by heating and melting in the non-flaming manner described, oxidation of the bonding material is greatly minimized.

While heat herein has been described as being applied from above the parts in a transducer (via clamping arms 26), it may also be applied as well from below, or from both above and below. To supply heat from below, there could be mounted on top of support base 24 a strip of an electrical resistance material like that used in arms 26. This strip would then, during an assembling operation, provide underlying support for parts to be joined in a transducer.

According to an important modification of the invention, a further step which may be used is that of surrounding the zone generally containing the transducer parts which are to be joined with a predominantly forming gas atmosphere. Such surrounding preferably takes place by producing a laminar flow of forming gas through this region from the time that current begins to flow in arms 26 until final solidification of the bond. The presence of a surrounding atmosphere which is predominantly forming gas still further reduces the likelihood of oxidation, and in addition, with the existence of a flow of such gas, aids in rapidly cooling and solidifying the molten bonding material. A satisfactory flow of such gas may be produced in the apparatus of FIGS. 3 and 4 through utilizing nozzles 30 with the gas flow rate mentioned earlier. Various other ways, of course, may be used to produce such a flow. After shutting off of the current flow in arms 26, it has been found satisfactory, for cooling purposes, to continue the gas flow for about 5 seconds.

Experience has shown that joining parts in a transducer, such as transducer 10, employing the steps just described results in a final construction having all of the desirable characteristics mentioned earlier. Of particular importance is the fact that heat for joining parts is only applied once for each bond 16.

While variations of the method of the invention have been described herein, it is appreciated that other variations and modifications are possible without departing from the spirit of the invention.

It is claimed and desired to secure by Letters Patent:

1. In the fabrication of an electrical deflection-sensitive transducer comprising a piezoresistive element having a pair of opposite ends, and a carrier for said element, the method of simultaneously joining both ends of the element to the carrier at spaced-apart regions thereon, comprising clamping the element and carrier together in the relative positions wherein it is desired they be joined by means including a first pair of spaced-apart clamping bodies, with each one of said first pair engaging a different end of the element, positioning a mass of a solid, meltable bonding material on the carrier adjacent each region of intended joinder between it and an end of said element, clamping said masses in place by means including a second pair of spaced-apart clamping bodies, with each one of said second pair engaging a different one of the masses, said second pair of bodies being of an electrically conductive material and connected for the conduction of an electrical current independent of any contact between either of said pair and that which they clamp, substantially simultaneously passing electrical current through each of the second pair of clamping bodies, by such passing, heating said bodies, conducting heat from the heated bodies to the respective masses, by such conducting, heating and melting said masses, flowing the molten masses into intimate contact with the respective ends of said element and regions on the carrier, shutting off the flow of electrical current through the second pair of clamping bodies, and while retaining said first and second pairs of clamping bodies in place, allowing the flowed masses to cool and solidify, and form deposits joined to and joining each end of the element to respective spaced-apart regions on the carrier.

2. The method of claim 1 which further includes, during said heating, conducting, melting, flowing and solidifying steps, surrounding each mass with an atmosphere consisting of by volume about 10 percent hydrogen and about 90 percent nitrogen.

3. In the fabrication of an electrical deflection-sensitive transducer comprising a piezoresistive element having a pair of opposite ends, a carrier for said element, and a pair of elongated conductors, one associated with each of said opposite ends, the method of simultaneously joining both ends of the element and their respective conductors to the carrier at spaced-apart regions thereon, comprising clamping the element and the carrier together in the relative positions wherein it is desired they be joined by means including a first pair of spaced-apart clamping bodies, with each one of said first pair engaging a different end of the element, positioning a mass of a solid, meltable bonding material on the carrier adjacent each region of intended joinder between it and an end of said element, placing an end portion of a different one of the conductors on each mass, clamping the conductors and masses in place by means including a second pair of spaced-apart clamping bodies, with each one of said second pair engaging a different end portion, each of said second pair of bodies being of an electrically conductive material and connected for the conduction of an electrical current independent of any contact between either of said pair and that which they clamp, substantially simultaneously passing electrical current through each of the second pairs of clamping bodies, by such passing, heating said bodies, conducting heat from the heated bodies to the respective conductor end portions and through said end portions to the respective masses, by said conducting, heating and melting said masses, flowing the molten masses into intimate contact with the respective ends of said element, end portions of said conductors, and regions on the carrier, shutting off the flow of electrical current through the second pair of clamping bodies, and while retaining said first and second pairs of clamping bodies in place, allowing the flowed masses to cool and solidify and form deposits joined to and joining each end of the element and its associated conductor end portion to respective spaced-apart regions on the carrier.

4. The method of claim 3 which further includes, during said heating, conducting, melting, flowing and solidifying steps, surrounding each mass with an atmosphere consisting of by volume about 10 percent hydrogen and about 90 percent nitrogen.

* * * * *